United States Patent
Matsuda

(10) Patent No.: US 10,843,682 B2
(45) Date of Patent: Nov. 24, 2020

(54) VEHICLE CONTROLLER

(71) Applicant: KAWASAKI JUKOGYO KABUSHIKI KAISHA, Kobe (JP)

(72) Inventor: Yoshimoto Matsuda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 101 days.

(21) Appl. No.: 15/987,777

(22) Filed: May 23, 2018

(65) Prior Publication Data

US 2018/0339699 A1 Nov. 29, 2018

(30) Foreign Application Priority Data

May 24, 2017 (JP) ................. 2017-102687

(51) Int. Cl.
*B60W 30/045* (2012.01)

(52) U.S. Cl.
CPC ....... *B60W 30/045* (2013.01); *B60W 2520/26* (2013.01); *B60W 2552/40* (2020.02); *B60W 2710/18* (2013.01); *B60W 2720/10* (2013.01); *B60W 2720/12* (2013.01)

(58) Field of Classification Search
CPC .......... B60W 2300/36; B60W 30/045; B60W 2520/26; B60W 2720/10; B60W 2710/18; B60W 2720/12; B60W 2550/148
See application file for complete search history.

(56) References Cited

U.S. PATENT DOCUMENTS

| | | | |
|---|---|---|---|
| 2012/0179327 A1* | 7/2012 | Yngve | ................ B60W 40/064 701/32.9 |
| 2012/0303234 A1 | 11/2012 | Matsuda | |
| 2013/0090828 A1* | 4/2013 | Lemejda | ............... B60W 10/06 701/83 |
| 2015/0112569 A1 | 4/2015 | Yamane et al. | |

(Continued)

FOREIGN PATENT DOCUMENTS

| | | |
|---|---|---|
| JP | H0597085 A | 4/1993 |
| JP | 2009241721 A | 10/2009 |

(Continued)

OTHER PUBLICATIONS

WO2017164342—Muzatani—English translation, (Year: 2017).*
WO-2013182257-A1, 2013 ABST (Year: 2013).*

*Primary Examiner* — Abby Y Lin
*Assistant Examiner* — Renee LaRose
(74) *Attorney, Agent, or Firm* — Alleman Hall Creasman & Tuttle LLP

(57) ABSTRACT

A vehicle controller calculates a lateral slip amount indicating a degree to which a target wheel to be controlled which is a front wheel or a rear wheel of a vehicle is slipping in a rightward and leftward direction on a ground surface; performs a lateral slip suppressing control including at least one of a control for reducing an absolute value of a command value of a longitudinal force in a forward and rearward direction which is applied from the ground surface to the target wheel and a control for increasing a distributed load applied to the target wheel, in a case where it is determined that the lateral slip amount is greater than a lateral slip limit threshold; and decides the lateral slip limit threshold based on at least one of the longitudinal force and a normal force applied to the target wheel.

10 Claims, 5 Drawing Sheets

(56) References Cited

U.S. PATENT DOCUMENTS

| | | | |
|---|---|---|---|
| 2018/0105151 A1* | 4/2018 | Gustafsson | ............. B60T 8/175 |
| 2019/0263210 A1* | 8/2019 | Nasu | ...................... B60W 40/10 |
| 2020/0023852 A1* | 1/2020 | Yi | ....................... B60W 40/105 |

FOREIGN PATENT DOCUMENTS

| | | | | |
|---|---|---|---|---|
| JP | 2012245843 A | | 12/2012 | |
| JP | 201580953 A | | 4/2015 | |
| JP | 2016185746 A | | 10/2016 | |
| WO | WO-2013182257 A1 | * | 12/2013 | ............ B60W 50/16 |
| WO | WO-2017164342 A1 | * | 9/2017 | .......... B60W 10/184 |

* cited by examiner

VEHICLE CONTROLLER

BACKGROUND OF THE INVENTION

Field of the Invention

The present invention relates to a vehicle controller which can suppress a lateral slip (side slip) of a drive wheel of a vehicle.

Description of the Related Art

Japanese Laid-Open Patent Application Publication No. 2015-80953 discloses a straddle vehicle which performs a longitudinal force control for reducing a longitudinal force applied to a drive wheel of a vehicle to reduce the longitudinal force, in a case where a lateral slip (side slip) acceleration rate exceeds a threshold.

In this configuration, the threshold is decided based on a vehicle speed. However, since the vehicle speed does not always correspond to a gripping state of the drive wheel with respect to a ground surface. For this reason, there is a possibility that the longitudinal force control is not initiated properly.

SUMMARY OF THE INVENTION

In view of the above-described circumstances, an object of the present invention is to initiate a control for suppressing a lateral slip (side slip) at a proper timing based on a gripping state of a drive wheel with respect to a ground surface.

According to an aspect of the present invention, a vehicle controller comprises: a lateral slip amount calculating section which calculates a lateral slip amount indicating a degree to which a target wheel to be controlled which is a front wheel or a rear wheel of a vehicle is slipping in a rightward and leftward direction on a ground surface; a lateral slip suppressing control section which performs a lateral slip suppressing control including at least one of a control for reducing an absolute value of a command value of a longitudinal force in a forward and rearward direction which is applied from the ground surface to the target wheel and a control for increasing a distributed load applied to the target wheel, in a case where the lateral slip suppressing control section determines that the lateral slip amount is greater than a lateral slip limit threshold; and a threshold deciding section which decides the lateral slip limit threshold based on at least one of the longitudinal force and a normal force applied to the target wheel.

In accordance with this configuration, the lateral slip limit threshold which is a condition used to determine whether or not to initiate the lateral slip suppressing control (control for reducing the absolute value of the command value of the longitudinal force applied to the target wheel and increasing the normal force applied to the target wheel), is decided based on at least one of the longitudinal force applied to the target wheel and the normal force applied to the target wheel. This makes it possible to initiate the lateral slip suppressing control at a proper timing based on the gripping state of the target wheel with respect to the ground surface.

The threshold deciding section may decide the lateral slip limit threshold based on both of the longitudinal force and the normal force.

In accordance with this configuration, the lateral slip suppressing control can be initiated at a more proper timing.

The vehicle controller may further comprise a normal force estimating section which estimates the normal force based on a pitching amount of a vehicle body, and the threshold deciding section may decide the lateral slip limit threshold based on at least the normal force.

In accordance with this configuration, the normal force applied to the target wheel can be easily obtained.

The normal force estimating section may estimate the normal force based on an extension/compression amount of a suspension.

In accordance with this configuration, the normal force can be estimated without a sensor mounted on the vehicle body to directly detect the pitching amount.

The lateral slip suppressing control section may perform the lateral slip suppressing control, in a case where the lateral slip suppressing control section determines that the vehicle is accelerated or decelerated.

In accordance with this configuration, the lateral slip suppressing control is performed only in a situation in which the lateral slip is likely to occur, without performing the lateral slip suppressing control during constant-speed traveling of the vehicle. Therefore, occurrence of an unnecessary control can be reduced.

The lateral slip suppressing control section may perform the lateral slip suppressing control, in a case where the lateral slip suppressing control section determines that a rider is performing an operation for accelerating the vehicle or performing a braking operation.

In accordance with this configuration, the lateral slip suppressing control is performed only in a situation in which the lateral slip is likely to occur, without performing the lateral slip suppressing control during constant-speed traveling of the vehicle. Therefore, occurrence of an unnecessary control can be reduced.

The lateral slip suppressing control section may control at least one of a plurality of suspensions which are provided at the front wheel and the rear wheel, respectively, to increase the distributed load applied to the target wheel, in a case where the lateral slip suppressing control section determines that the lateral slip amount is greater than the lateral slip limit threshold.

In accordance with this configuration, since the distributed load applied to the target wheel which is slipping sideways is increased, the size of a friction circle of the target wheel is increased. As a result, the lateral slip can be suppressed. This makes it possible to lessen the amount of reduction of the absolute value of the longitudinal force during the lateral slip suppressing control, and suppress a change in the acceleration rate in the forward and rearward direction which is felt by the rider.

The lateral slip suppressing control section may control at least one of driving power or a braking force of the target wheel and an operation resistance of a driving power source which generates the driving power for allowing the vehicle to travel, in a case where the lateral slip suppressing control section determines that the lateral slip amount is greater than the lateral slip limit threshold.

In accordance with this configuration, by controlling at least one of the driving power or braking force of the target wheel and the operation resistance of the driving power source (e.g., engine braking or motor regenerative braking force), the longitudinal force with respect to the friction circle of the target wheel can be made smaller. In this way, the lateral slip can be easily prevented.

The vehicle controller may further comprise: a lateral slip prevention control section which performs a lateral slip prevention control for controlling the command value of the longitudinal force so that a total force of a lateral force and the longitudinal force which are applied to the target wheel does not exceed a gripping limit of the target wheel with respect to the ground surface, before the lateral slip amount exceeds the lateral slip limit threshold.

Even in a case where the lateral slip occurs in a state in which the lateral slip prevention control is performed by the lateral slip prevention control section, the lateral suppressing control performed by the lateral slip suppressing control functions as a fail-safe. This contributes to improve the functions of the vehicle.

The vehicle controller may further comprise: a longitudinal slip amount calculating section which calculates a longitudinal slip amount indicating a degree to which the target wheel is slipping in a forward and rearward direction on the ground surface; and a longitudinal slip suppressing control section which reduces an absolute value of the longitudinal force, in a case where the longitudinal slip suppressing control section determines that the longitudinal slip amount is greater than a longitudinal slip threshold.

In accordance with this configuration, since the longitudinal slip suppressing control is performed in addition to the lateral slip suppressing control, a slip of the target wheel in all directions can be suppressed, and hence a complicated slip can be well dealt with.

The above and further objects, features and advantages of the present invention will more fully be apparent from the following detailed description of preferred embodiment with reference to accompanying drawings.

DETAILED DESCRIPTION OF THE EMBODIMENTS

Hereinafter, the embodiments of the present invention will be described with reference to the accompanying drawings. The stated directions are from the perspective of a rider straddling a motorcycle.

Embodiment 1

Figure 1:
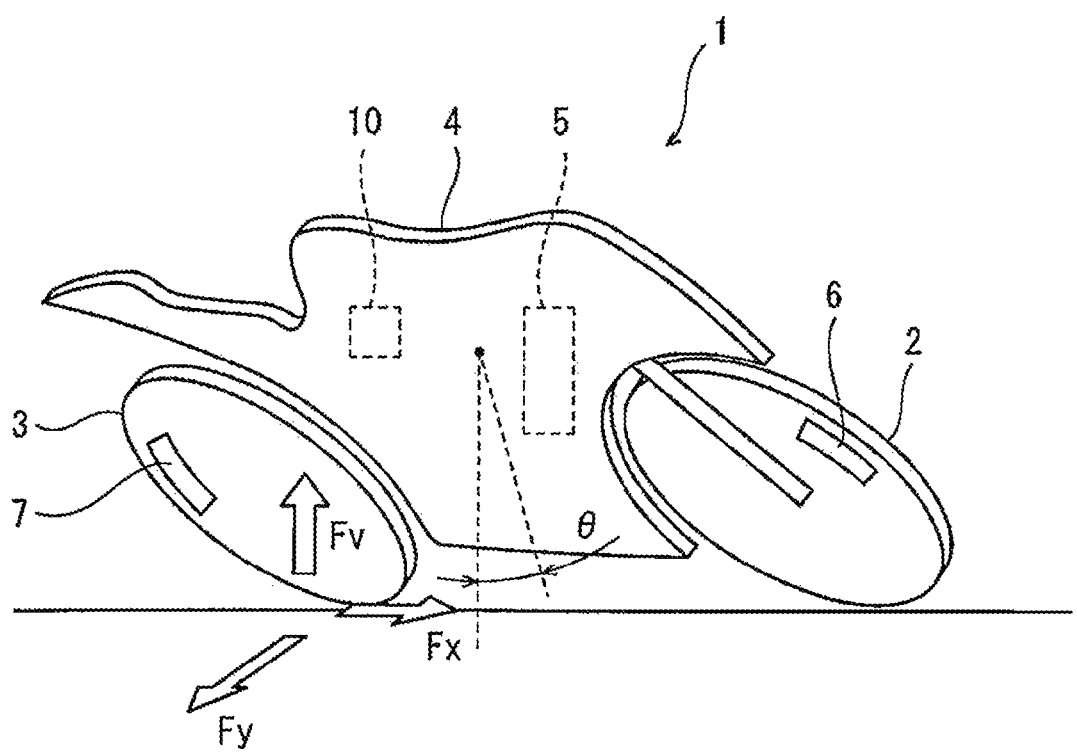
FIG. 1 is a perspective view showing a turn state of a motorcycle including a vehicle controller according to Embodiment 1.

FIG. 1 is a perspective view showing a turn state of a motorcycle 1 including a vehicle controller 10 according to Embodiment 1. As shown in FIG. 1, the vehicle controller 10 is mounted in a straddle vehicle which travels while tilting a vehicle body to the right or the left in a state in which a lateral force is applied to a drive wheel from a ground surface. The motorcycle 1 is a suitable example of the straddle vehicle. The motorcycle 1 includes a front wheel 2 which is a driven wheel and a rear wheel 3 which is a drive wheel. The motorcycle 1 turns in a state (bank state) in which a vehicle body 4 is tilted to the right or the left around a front-rear axis AX passing through a front wheel ground point (point on which the front wheel 2 is grounded) and a rear wheel ground point (point on which the rear wheel 3 is grounded). A bank angle θ is defined as a tilt angle of the vehicle body 4 around the front-rear axis AX with respect to an upright state of the vehicle body 4 (the bank angle θ in the upright state is zero).

The motorcycle 1 includes a driving power source which generates driving power for allowing the motorcycle 1 to travel. Although in Embodiment 1, an engine 5 (internal combustion engine) is used as the driving power source, an electric motor may be used instead of the engine, or both of the engine and the electric motor may be used. The engine 5 applies the driving power to the rear wheel 3 via a driving power transmission mechanism (e.g., gears, a transmission, a chain (or belt), etc.).

The motorcycle 1 includes a hydraulic brake device which brakes the front wheel 2 and the rear wheel 3. This hydraulic brake device includes a front brake unit 6 which brakes the front wheel 2, a rear brake unit 7 which brakes the rear wheel 3, and a brake control unit 8 which controls the front brake unit 6 and the rear brake unit 7. The front brake unit 6 and the rear brake unit 7 are operative independently of each other. The front brake unit 6 is configured to apply a braking force proportional to a brake pressure to the front wheel 2. The rear brake unit 7 is configured to apply a braking force proportional to a brake pressure to the rear wheel 3.

Forces applied from the ground surface to a wheel include a longitudinal force $F_x$ applied to the wheel in a longitudinal direction (forward and rearward direction), a lateral force $F_y$ applied to the wheel in a lateral direction (rightward and leftward direction), and a normal force $F_v$ applied to the wheel in a vertically upward direction. In Embodiment 1, the rear wheel 3 as the drive wheel is a target wheel to be controlled. Main factors for applying the longitudinal force $F_x$ to the rear wheel 3 include, for example, the driving power transmitted from the engine 5 to the rear wheel 3 and the braking force applied from the rear brake unit 7 to the rear wheel 3. The lateral force $F_y$ is applied to the rear wheel 3 while the vehicle body 4 is turning. A main factor for applying the lateral force $F_y$ to the rear wheel 3 includes, for example, a reaction force of a centrifugal force based on a traveling speed and a turn radius.

Figure 2:
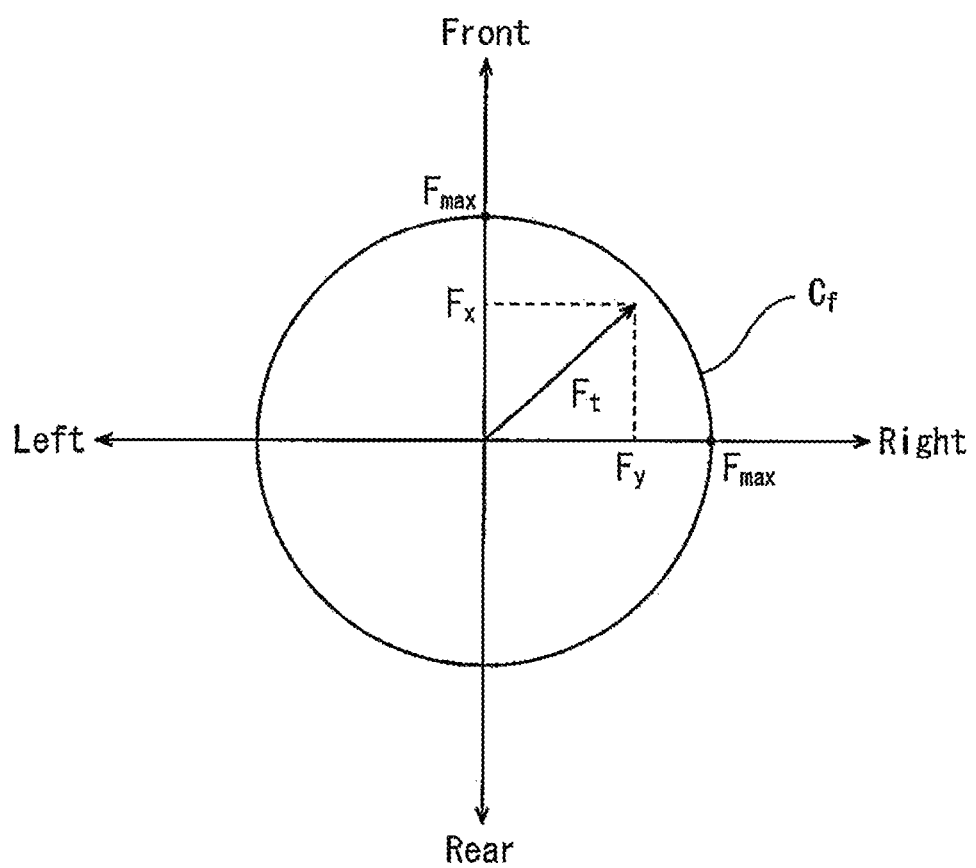
FIG. 2 is a plan view showing a friction circle of a rear wheel of the motorcycle.

FIG. 2 is a plan view showing a friction circle of the rear wheel 3. As shown in FIG. 2, a friction circle $C_f$ of the rear wheel 3 is a circle indicating a gripping limit of the rear wheel 3 with respect to the ground surface. More specifically, the friction circle $C_f$ is a circle in which the rear wheel ground point on a horizontal plane perpendicular to a vertical direction is the center of the circle and the magnitude of a maximum frictional force (a product of a friction coefficient between the ground surface and the rear wheel 3 and the normal force $F_v$ applied to the rear wheel 3) is the radius of the circle. A point of origin of a total force $F_t$ of the longitudinal force $F_x$ and the lateral force $F_y$ is located on the center of the friction circle $C_f$. When the end point of the total force $F_t$ is located outside the friction circle $C_f$, the rear wheel 3 slips. While the end point of the total force $F_t$ is within the friction circle $C_f$, the total force $F_t$ and the frictional force are balanced, and the slip of the rear wheel 3 is prevented. When the total force $F_t$ exceeds the friction circle $C_f$, the total force $F_t$ is greater than the maximum frictional force. Therefore, the rear wheel 3 slips against the maximum frictional force.

Figure 3:
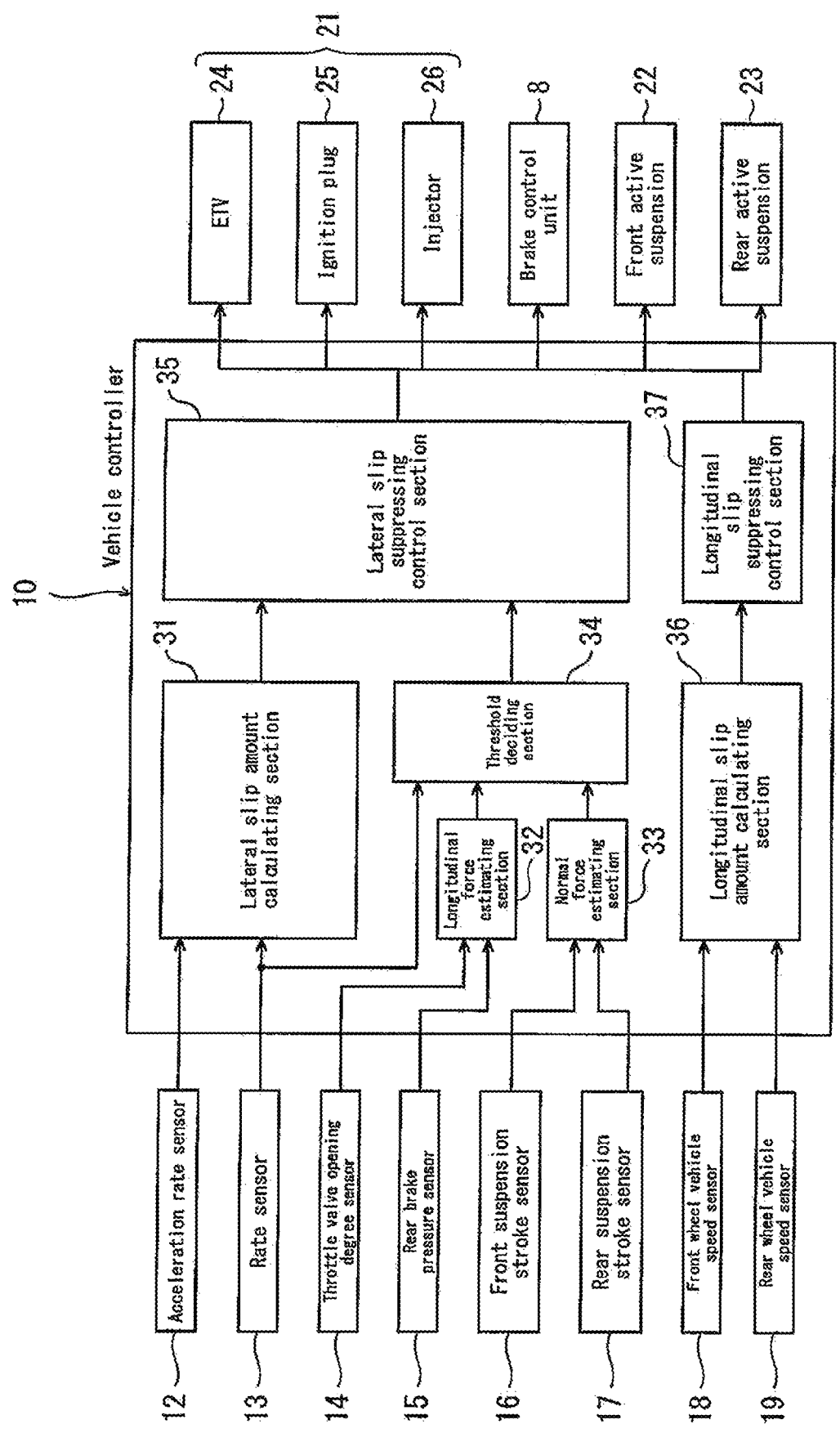
FIG. 3 is a block diagram showing a vehicle controller mounted in the motorcycle of FIG. 1.

FIG. 3 is a block diagram showing the vehicle controller 10 mounted in the motorcycle 1 of FIG. 1. The vehicle controller 10 is configured to control driving power adjustment constituents 21 of the engine 5, the brake control unit 8, a front active suspension 22, and/or a rear active suspension 23 based on signals from sensors 12 to 19 (acceleration rate sensor 12, rate sensor 13, throttle valve opening degree sensor 14, rear brake pressure sensor 15, front suspension stroke sensor 16, rear suspension stroke sensor 17, front wheel vehicle speed sensor 18, and rear wheel vehicle speed sensor 19) mounted on the motorcycle 1, to suppress a slip of the rear wheel 3, in a case where the slip occurs.

The acceleration rate sensor 12 is capable of detecting the acceleration rate of the vehicle body 4, for example, acceleration rate of the vehicle body 4 in the rightward and leftward direction. The rate sensor 13 is capable of detecting an angular displacement change rate of the vehicle body 4. The rate sensor 13 is capable of detecting, for example, yaw rate γ of the vehicle body 4 (angular displacement change rate around a vertical axis, of a center of gravity of the vehicle body 4). The rate sensor 13 is capable of detecting the bank angle θ of the vehicle body 4 by detecting and integrating an angular displacement change rate in a roll direction. The throttle valve opening degree sensor 14 is configured to detect the opening degree of an electronic control throttle valve 24. The rear brake pressure sensor 15 is configured to detect the brake pressure of the rear brake unit 7. The front suspension stroke sensor 16 is a stroke sensor which detects the extension/compression amount of the front active suspension 22. The rear suspension stroke sensor 17 is a stroke sensor which detects the extension/compression amount of the rear active suspension 23. The front wheel vehicle speed sensor 18 is configured to detect the rotational speed of the front wheel 2. Since the front wheel 2 is the driven wheel, the rotational speed of the front wheel 2 which is detected by the front wheel vehicle speed sensor 18 is substantially equal to the traveling speed of the motorcycle 1. The rear wheel vehicle speed sensor 19 is configured to detect the rotational speed of the rear wheel 3.

The driving power adjustment constituents 21 include the electronic control throttle 24, an ignition plug 25, and a fuel injector 26. The driving power of the engine 5 is reduced or engine braking occurs by reducing the opening degree (opening rate) of the electronic control throttle 24, retarding the ignition timing of the ignition plug 25, and reducing the amount of fuel injected from the fuel injector 26 (fuel injection amount of the fuel injector 26). The driving power of the engine 5 is increased by increasing the opening degree of the electronic control throttle 24, advancing the ignition timing of the ignition plug 25, and increasing the amount of fuel injected from the fuel injector 26. The front active suspension 22 suspends the front wheel 2 from the vehicle body 4. The rear active suspension 23 suspends the rear wheel 3 from the vehicle body 4. Each of the front active suspension 22 and the rear active suspension 23 is a known suspension capable of changing a damping coefficient in response to a command externally input.

The vehicle controller 10 includes a processor, a volatile memory, a non-volatile memory, an I/O interface, and the like, as hardware. The vehicle controller 10 includes functional blocks which are a lateral slip amount calculating section 31, a longitudinal force estimating section 32, a normal force estimating section 33, a threshold deciding section 34, a lateral slip suppressing control section 35, a longitudinal slip amount calculating section 36, and a longitudinal slip suppressing control section 37. These functional blocks are implemented in such a manner that the processor performs computations by use of the volatile memory based on programs stored in the non-volatile memory.

The lateral slip amount calculating section 31 is configured to calculate a lateral slip amount indicating a degree to which the rear wheel 3 is slipping sideways (in the rightward and leftward direction) on the ground surface. The lateral slip amount calculating section 31 is configured to calculate, for example, the lateral force $F_y$ applied to the rear wheel 3, as a lateral slip amount (side slip amount). The lateral slip amount calculating section 31 is configured to calculate the lateral force $F_y$ according to the following formula 1.

$$F_y = f_1(\alpha, \gamma) \quad \text{formula (1)}$$

In formula 1, α indicates a lateral acceleration rate in a horizontal direction which is applied to the vehicle body 4 in the rightward and leftward direction. γ indicates the yaw rate detected by the rate sensor 13. $f_1$ indicates a function in which the lateral force $F_y$ increases as the lateral acceleration rate α increases and increases as the yaw rate γ increases.

In a state in which the vehicle body 4 is banked, a detection direction of the acceleration rate sensor 12 is inclined with respect to a horizontal plane, together with the vehicle body 4. Therefore, the lateral acceleration rate α of the formula (1) is calculated according to the following formula (2).

$$\alpha = A \cdot \arccos \theta \quad \text{formula (2)}$$

In formula (2), A indicates the lateral acceleration rate detected by the acceleration rate sensor 12. θ indicates the bank angle.

The longitudinal force estimating section 32 is configured to estimate the longitudinal force $F_x$ applied to the rear wheel 3, according to the following formula (3).

$$F_x = f_2(Th, Bp) \quad \text{formula (3)}$$

In formula (3), Th indicates the throttle valve opening degree (opening rate) detected by the throttle valve opening degree sensor 14. Bp indicates the brake pressure detected by the rear brake pressure sensor 15. $f_2$ indicates a function in which the longitudinal force $F_x$ increases as the throttle valve opening degree Th increases and decreases (the longitudinal force $F_x$ increases to a minus side) as the brake pressure Bp increases.

The normal force estimating section 33 is configured to estimate the normal force $F_v$ applied to the rear wheel 3. In Embodiment 1, the normal force estimating section 33 is configured to estimate the normal force $F_v$ based on a pitching amount of the vehicle body 4. In a case where the extension amount of the rear active suspension 23 is less than the extension amount of the front active suspension 22, a ratio of a sprung weight (sprung mass) $W_H$ of the motorcycle 1 which is applied to the rear wheel 3 increases. On other hand, in a case where the extension amount of the rear active suspension 23 is greater than the extension amount of the front active suspension 22, the ratio of the sprung weight (sprung mass) $W_H$ of the motorcycle 1 which is applied to the rear wheel 3 decreases. In light of this, in Embodiment 1, for example, the normal force estimating section 33 is configured to estimate the normal force $F_v$ applied to the rear wheel 3 based on the extension/compression amounts of the suspensions 22, 23. More specifically, the normal force estimating section 33 contains information of the sprung weight (sprung mass) $W_H$ of the motorcycle 1 and information of an unsprung weight (unsprung mass) $W_L$ on the rear wheel 3 side. The normal force estimating section 33 is configured to calculate a ratio k ($0 \leq k \leq 1$) of the sprung weight $W_H$ which is applied to the rear wheel 3, based on a ratio of the extension amount of the front active suspension 22 to the extension amount of the rear active suspension 23, and estimate the normal force $F_v$ according to the following formula 4:

$$F_v = k \cdot W_H + W_L \quad \text{formula (4)}$$

The threshold deciding section 34 is configured to decide a lateral slip limit threshold $F_{y\text{-}th}$ used to determine occurrence of the lateral slip of the rear wheel 3. The lateral slip limit threshold $F_{y\text{-}th}$ corresponds to a lateral force at a time point when the end point of the total force $F_t$ is located on the friction circle $C_f$ (see FIG. 2), and is decided according to the following formula (5):

$$F_{y\text{-}th} = \sqrt{1 - \frac{F_x}{F_{max}}} \qquad \text{formula (5)}$$

In formula (5), $F_{max}$ indicates the radius of the friction circle $C_f$.

The size of the friction circle $C_f$ increases as the normal force $F_v$ applied to the rear wheel 3 increases and decreases as the inclination angle of the rear wheel 3 in the rightward and leftward direction increases. Therefore, the radius $F_{max}$ of the friction circle $C_f$ of the formula (5) is derived according to the following formula (6):

$$F_{max} = f_3(F_v, \theta) \qquad \text{formula (6)}$$

In formula (6), $F_v$ indicates the normal force estimated by the normal force estimating section 33. $\theta$ indicates the bank angle derived from the detection value of the rate sensor 13. f3 indicates a function in which the radius $F_{max}$ of the friction circle $C_f$ increases as the normal force $F_v$ increases and decreases as the bank angle $\theta$ increases.

In a case where the lateral slip suppressing control section 35 determines that the lateral slip amount (lateral force $F_y$) calculated by the lateral slip amount calculating section 31 is greater than (has exceeded) the lateral slip limit threshold $F_{y\text{-}th}$ decided by the threshold deciding section 34, the lateral slip suppressing control section 35 initiates a lateral slip suppressing control. In the lateral slip suppressing control, the lateral slip suppressing control section 35 decreases the absolute value of the command value of the longitudinal force $F_x$, and increases a distributed load (normal force $F_v$) applied to the rear wheel 3. In other words, in the lateral slip suppressing control, the lateral slip suppressing control section 35 reduces the total force $F_t$ of the longitudinal force $F_x$ and the lateral force $F_y$ by reducing the longitudinal force $F_x$, and increases the size of the friction circle $C_f$ by increasing the normal force $F_v$ so that the total force $F_t$ of the longitudinal force $F_x$ and the lateral force $F_y$ falls within the friction circle $C_f$.

The longitudinal slip amount calculating section 36 is configured to calculate a longitudinal slip amount indicating a degree to which the rear wheel 3 is slipping in the longitudinal direction (forward and rearward direction) on the ground surface. The longitudinal slip amount calculating section 36 is configured to calculate as the longitudinal slip amount, for example, a slip ratio $S_x$ in the forward and rearward direction, according to the following formula (7):

$$S_x = \frac{V_r - V_f}{V_f} \qquad \text{formula (7)}$$

In formula (7), $V_f$ indicates the rotational speed of the front wheel 2, and $V_r$ indicates the rotational speed of the rear wheel 3.

In a case where the longitudinal slip suppressing control section 37 determines that the longitudinal slip amount (slip ratio $S_x$) calculated by the longitudinal slip amount calculating section 36 is greater than a longitudinal slip limit threshold $S_{th}$, the longitudinal slip suppressing control section 37 initiates a longitudinal slip suppressing control for reducing the absolute value of the command value of the longitudinal force $F_x$ and increasing the distributed load (normal force $F_v$) applied to the rear wheel 3. In the longitudinal slip suppressing control, the longitudinal slip suppressing control section 37 reduces the absolute value of the command value of the longitudinal force $F_x$ and increases the distributed load (normal force $F_v$) applied to the rear wheel 3.

Figure 4:
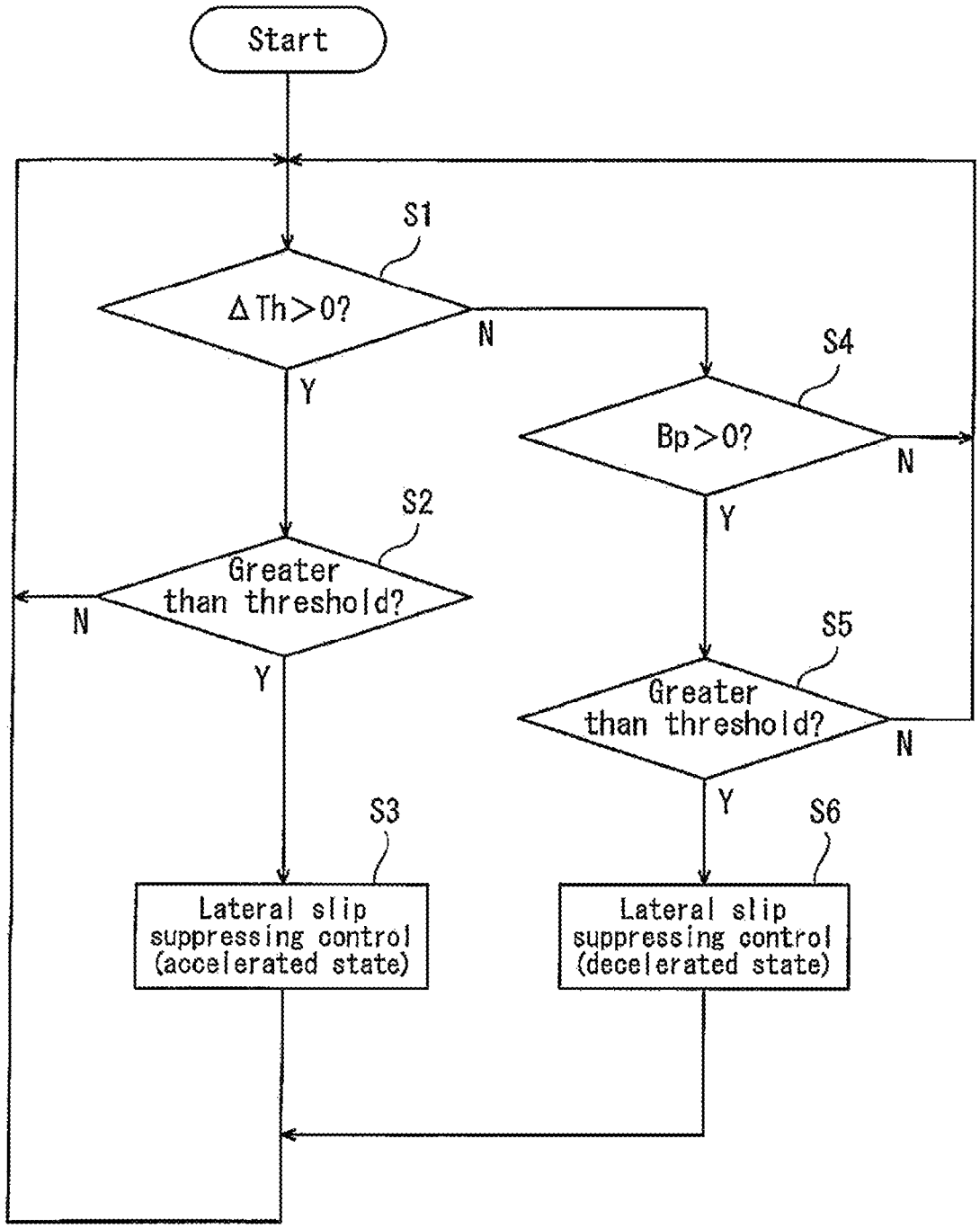
FIG. 4 is a flowchart showing a control procedure of the vehicle controller of FIG. 3.

FIG. 4 is a flowchart showing a control procedure of the vehicle controller 10 of FIG. 3. Referring now to FIG. 4, in the vehicle controller 10, the lateral slip suppressing control section 35 determines whether or not a change rate $\Delta$ Th of the throttle valve opening degree Th detected by the throttle valve opening degree sensor 14 is a positive value (step S1). In other words, in step S1, the lateral slip suppressing control section 35 determines whether or not the motorcycle 1 is accelerated, or the rider is performing an operation for accelerating the motorcycle 1. In a case where the lateral slip suppressing control section 35 determines that the change rate $\Delta$ Th of the throttle valve opening degree Th is the positive value (Step S1: Yes), the lateral slip suppressing control section 35 determines whether or not the lateral force $F_y$ calculated by the lateral slip amount calculating section 31 is greater than the lateral slip limit threshold $F_{y\text{-}th}$ decided by the threshold deciding section 34 (step S2). In a case where the lateral slip suppressing control section 35 determines that the lateral force $F_y$ is greater than the lateral slip limit threshold $F_{y\text{-}th}$, the lateral slip suppressing control section 35 initiates the lateral slip suppressing control corresponding to an accelerated state (step S3).

In the lateral slip suppressing control corresponding to the accelerated state, the lateral slip suppressing control section 35 reduces the driving power command value(s) (command value of the longitudinal force $F_x$) for the driving power adjustment constituent(s) 21, and increases the normal force $F_v$ applied to the rear wheel 3. Specifically, the lateral slip suppressing control section 35 reduces the driving power command value(s) for the driving power adjustment constituent(s) 21 by performing at least one of reducing an opening degree (opening degree) command value for the electronic control throttle 24, retarding an ignition timing command value for the ignition plug 25, and reducing a fuel injection amount command value for the fuel injector 26. By reducing the driving power command value(s) for the driving power adjustment constituent(s) 21, the power of the engine 5 is reduced, or engine braking occurs. The lateral slip suppressing control section 35 increases the normal force $F_v$ applied to the rear wheel 3 by performing at least one of increasing the extension amount of the front active suspension 22 and reducing the extension amount of the rear active suspension 23.

In a case where the lateral slip suppressing control section 35 determines that the change rate $\Delta$ Th is not the positive value (Step S1: No), the lateral slip suppressing control section 35 does not perform the lateral slip suppressing control corresponding to the accelerated state (step S3), and moves to a flow of a lateral slip suppressing control corresponding to a decelerated state. Specifically, the lateral slip suppressing control section 35 determines whether or not the rear brake unit 7 is activated (step S4). Specifically, in step S4, the lateral slip suppressing control section 35 determines whether or not the brake pressure Bp is a positive value. In a case where the lateral slip suppressing control section 35 determines that the brake pressure Bp is not the positive value (step S4: No), the lateral slip suppressing control section 35 moves back to step S1.

On the other hand, in a case where the lateral slip suppressing control section 35 determines that the brake pressure Bp is the positive value (step S4: Yes), the lateral slip suppressing control section 35 determines whether or not the lateral force $F_y$ calculated by the lateral slip amount calculating section 31 is greater than the lateral slip limit threshold $F_{y-th}$ decided by the threshold deciding section 34 (step S5). In a case where the lateral slip suppressing control section 35 determines that the lateral force $F_y$ is greater than the lateral slip limit threshold $F_{y-th}$ (step S5: Yes), the lateral slip suppressing control section 35 initiates the lateral slip suppressing control corresponding to a decelerated state (step S6).

In the lateral slip suppressing control corresponding to the decelerated state, the lateral slip suppressing control section 35 reduces the braking force (command value of the longitudinal force $F_x$) of the rear wheel 3 and increases the normal force $F_v$ applied to the rear wheel 3. Specifically, the lateral slip suppressing control section 35 reduces the braking force of the rear wheel 3 by causing the brake control unit 8 to reduce the brake pressure Bp of the rear brake unit 7. The lateral slip suppressing control section 35 increases the normal force $F_v$ applied to the rear wheel 3 by performing at least one of increasing the extension amount of the front active suspension 22 and reducing the extension amount of the rear active suspension 23.

In accordance with the above-described configuration, the lateral slip limit threshold $F_{y-th}$ which is a condition used to determine whether or not to initiate the lateral slip suppressing control (control for reducing the absolute value of the command value of the longitudinal force $F_x$ and increasing the normal force $F_v$ applied to the rear wheel 3), is decided based on the longitudinal force $F_x$ and the normal force $F_v$ applied to the rear wheel 3. This makes it possible to initiate the lateral slip suppressing control at a proper timing based on the gripping state of the rear wheel 3 with respect to the ground surface.

Since the lateral slip limit threshold $F_{y-th}$ is decided based on the normal force $F_v$ applied to the rear wheel 3 which is estimated based on the extension/compression amounts of the suspensions 22, 23, the normal force $F_v$ applied to the rear wheel 3 can be easily obtained. In a case where the lateral slip suppressing control section 35 determines that the motorcycle 1 is accelerated or decelerated (the rider is performing the operation for accelerating the motorcycle 1 or performing a braking operation), it performs the lateral slip suppressing control. On the other hand, in a case where the lateral slip suppressing control section 35 determines that the motorcycle 1 is not accelerated or decelerated (the rider is not performing the operation for accelerating the motorcycle 1 or is not performing the braking operation), it does not perform the lateral slip suppressing control. Thus, the lateral slip suppressing control is performed only in a situation in which the lateral slip is likely to occur, and unnecessary control is not performed.

In a case where the lateral slip suppressing control section 35 determines that the lateral force $F_y$ is greater than the lateral slip limit threshold $F_{y-th}$, it controls the front active suspension 22 and/or the rear active suspension 23 to increase the normal force $F_v$ applied to the rear wheel 3. This increase the size of the friction circle $C_f$ of the rear wheel 3 which is slipping sideways. As a result, the lateral slip can be suppressed. This makes it possible to lessen the amount of reduction of the absolute value of the longitudinal force $F_x$ during the lateral slip suppressing control, and suppress a change in the acceleration rate in the forward and rearward direction which is felt by the rider. In addition, the longitudinal slip suppressing control is performed in addition to the lateral slip suppressing control. In this way, a slip of the rear wheel 3 in all directions can be suppressed, and hence a complicated slip can be well dealt with.

Embodiment 2

Figure 5:
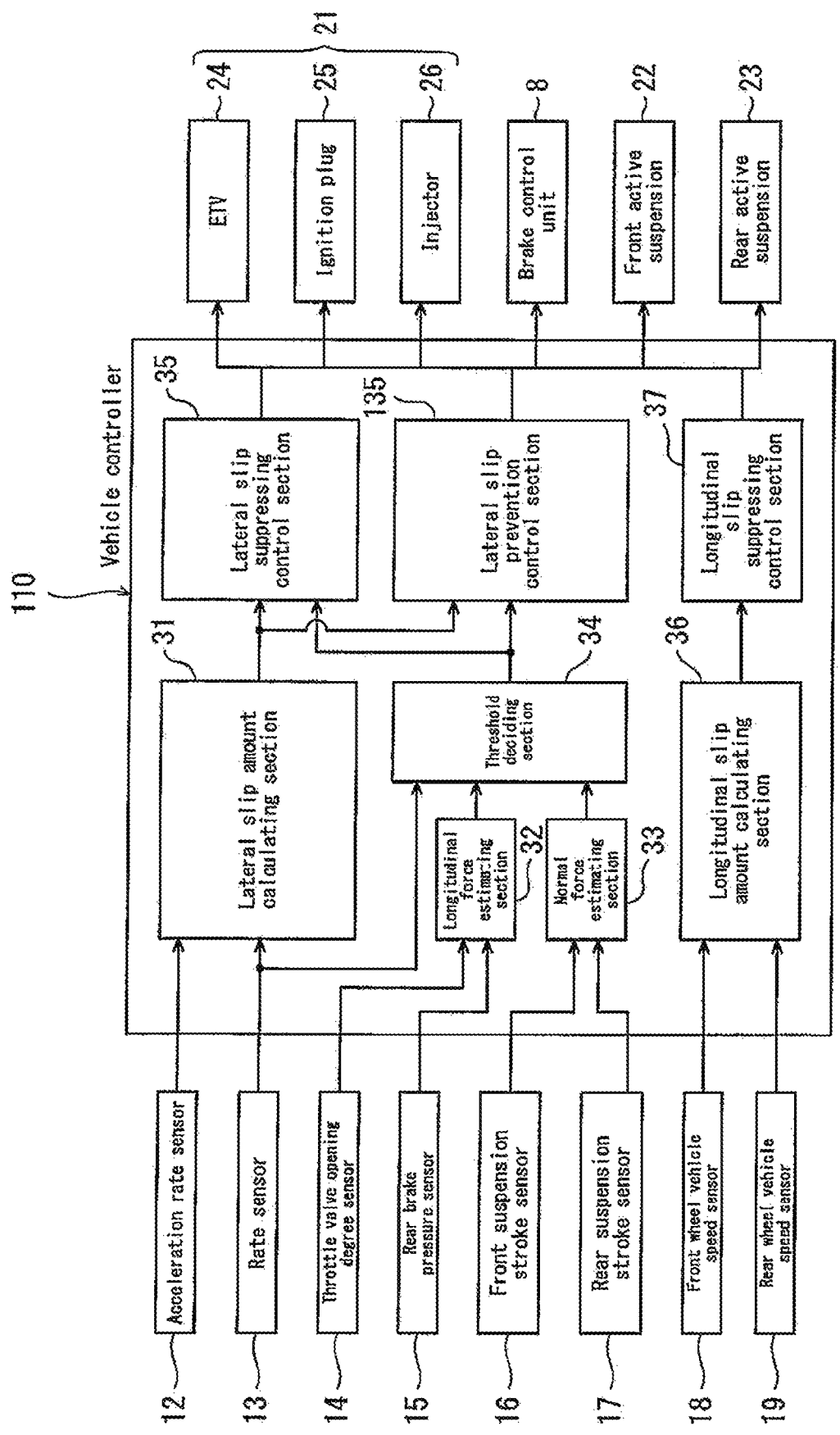
FIG. 5 is a block diagram showing a vehicle controller according to Embodiment 2.

FIG. 5 is a block diagram showing a vehicle controller 110 according to Embodiment 2. In FIG. 5, the same constituents as those of Embodiment 1 are designated by the same reference symbols and will not be described in repetition. The vehicle controller 110 includes a lateral slip prevention control section 135 which controls the command value of the longitudinal force $F_x$ so that the total force $F_t$ of the longitudinal force $F_x$ and the lateral force $F_y$ does not exceed a gripping limit of the rear wheel 3, before the lateral slip (slide slip) occurs. For example, in a case where the lateral slip prevention control section 135 determines that an initiation condition including a condition in which the motorcycle is accelerated or decelerated (the rider is performing the operation for accelerating the motorcycle 1 or performing the braking operation) and the bank angle θ is greater than a predetermined value, is met, the lateral slip prevention control section 135 performs a lateral slip prevention control for controlling the driving power adjustment constituent(s) 21 or the rear brake unit 7 to reduce the absolute value of the command value of the longitudinal force $F_x$. Specifically, the lateral slip prevention control section 135 performs the lateral slip prevention control corresponding to the accelerated state by performing at least one of reducing the opening degree (opening rate) command value for the electronic control throttle 24, retarding the ignition timing command value for the ignition plug 25, and reducing the fuel injection amount command value for the fuel injector 26. The lateral slip prevention control section 135 performs the lateral slip prevention control corresponding to the decelerated state by causing the brake control unit 8 to reduce the brake pressure Bp of the rear brake unit 7.

Even in a case where the lateral slip occurs in a state in which the lateral slip prevention control is performed by the lateral slip prevention control section 135, the lateral slip suppressing control performed by the lateral slip suppressing control section 35 functions as a fail-safe. This contributes to improve the function of the motorcycle 1. The other constituents are the same as those of Embodiment 1, and will not be described in repetition.

The present invention is not limited to the above-described embodiments, and the constituents of the invention may be changed, added or deleted. The lateral slip amount calculating section 31 may calculate anything other than the lateral force, as the lateral slip amount, so long as it indicates a degree to which the rear wheel 3 is slipping sideways in the rightward and leftward direction on the ground surface. For example, the lateral slip amount may be a lateral slip acceleration rate, a yaw rate or a yaw rate differential value (derivative value). An accelerator opening degree (opening rate) sensor which detects the opening degree of an accelerator operation member operated by the rider may be used instead of the throttle valve opening degree sensor 14. A rear brake operation sensor which detects the operation amount of a rear brake operation member operated by the rider may be used instead of the rear brake pressure sensor 15. Further, the longitudinal force estimating section 32 may derive the longitudinal force $F_x$ from a detection value of an acceleration rate sensor or a detection value of a torque sensor. The normal force estimating section 33 may derive the normal force $F_v$ by detecting a load which works in the extension/compression direction of the suspension of the front wheel 2. The normal force estimating section 33 may estimate the normal force $F_v$ by calculating a ratio of the sprung weight which is applied to the rear wheel 3, based on a pitching amount of the vehicle body 4 which is detected by a pitching sensor.

The threshold deciding section 34 may decide the lateral slip limit threshold $F_{y-th}$, based on one of the longitudinal force $F_x$ and the normal force $F_v$ which are applied to the rear wheel 3. The lateral slip suppressing control section 35 may control only one of the front suspension 22 and the rear suspension 23 to increase the distributed load applied to the rear wheel 3. The lateral slip suppressing control section 35 may perform only the control for the longitudinal force $F_x$ without controlling the distributed load applied to the rear wheel 3. One of the front suspension 22 and the rear suspension 23 may be an active suspension, and the other may be a passive suspension. The longitudinal slip amount calculating section 36 may calculate a rotational speed change rate of the rear wheel 3 as the longitudinal slip amount, instead of the slip ratio $S_x$ in the forward and rearward direction. The target wheel to be controlled may be the front wheel 2 rather than the rear wheel 3, or may be both of the front wheel 2 and the rear wheel 3. The bank angle θ may be detected by a bank angle sensor instead of the rate sensor 13.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

The invention claimed is:

1. A vehicle controller comprising:
   a lateral slip amount calculating section which calculates a lateral slip amount indicating a degree to which a target wheel to be controlled which is a front wheel or a rear wheel of a vehicle is slipping in a rightward and leftward direction on a ground surface;
   a lateral slip suppressing control section which performs a lateral slip suppressing control including at least one of a control for reducing an absolute value of a command value of a longitudinal force in a forward and rearward direction which is applied from the ground surface to the target wheel and a control for increasing a distributed load applied to the target wheel, in a case where the lateral slip suppressing control section determines that the lateral slip amount is greater than a lateral slip limit threshold;
   a normal force estimating section which estimates a normal force based on a ratio of a load of the front wheel to a load of the rear wheel; and
   a threshold deciding section which decides the lateral slip limit threshold based on the normal force applied to the target wheel.

2. The vehicle controller according to claim 1, wherein the threshold deciding section decides the lateral slip limit threshold based on the longitudinal force in addition to the normal force.

3. The vehicle controller according to claim 1, wherein the normal force estimating section estimates the normal force based on a ratio of an extension amount of a front suspension to an extension amount of a rear suspension.

4. The vehicle controller according to claim 1, wherein the lateral slip suppressing control section performs the lateral slip suppressing control, in a case where the lateral slip suppressing control section determines that the vehicle is accelerated or decelerated.

5. The vehicle controller according to claim 1, wherein the lateral slip suppressing control section performs the lateral slip suppressing control, in a case where the lateral slip suppressing control section determines that a rider is performing an operation for accelerating the vehicle or performing a braking operation.

6. The vehicle controller according to claim 1, wherein the lateral slip suppressing control section controls at least one of a plurality of suspensions which are provided at the front wheel and the rear wheel, respectively, to increase the distributed load applied to the target wheel, in a case where the lateral slip suppressing control section determines that the lateral slip amount is greater than the lateral slip limit threshold.

7. The vehicle controller according to claim 1, wherein the lateral slip suppressing control section controls at least one of driving power or a braking force of the target wheel and an operation resistance of a driving power source which generates the driving power for allowing the vehicle to travel, in a case where the lateral slip suppressing control section determines that the lateral slip amount is greater than the lateral slip limit threshold.

8. The vehicle controller according to claim 1, further comprising:
   a lateral slip prevention control section which performs a lateral slip prevention control for controlling the command value of the longitudinal force so that a total force of a lateral force and the longitudinal force which are applied to the target wheel does not exceed a gripping limit of the target wheel with respect to the ground surface, before the lateral slip amount exceeds the lateral slip limit threshold.

9. The vehicle controller according to claim 1, further comprising:
   a longitudinal slip amount calculating section which calculates a longitudinal slip amount indicating a degree to which the target wheel is slipping in a forward and rearward direction on the ground surface; and
   a longitudinal slip suppressing control section which reduces an absolute value of the longitudinal force, in a case where the longitudinal slip suppressing control section determines that the longitudinal slip amount is greater than a longitudinal slip threshold.

10. A vehicle controller comprising:
    a lateral slip amount calculating section which calculates a lateral slip amount indicating a degree to which a target wheel to be controlled which is a front wheel or a rear wheel of a vehicle is slipping in a rightward and leftward direction on a ground surface;
    a lateral slip suppressing control section which performs a lateral slip suppressing control including at least one of a control for reducing an absolute value of a command value of a longitudinal force in a forward and rearward direction which is applied from the ground surface to the target wheel and a control for increasing a distributed load applied to the target wheel, in a case where the lateral slip suppressing control section determines that the lateral slip amount is greater than a lateral slip limit threshold; and a threshold deciding section which decides the lateral slip limit threshold based on at least one of the longitudinal force and a normal force applied to the target wheel, wherein the lateral slip suppressing control section controls at least one of a plurality of suspensions which are provided at the front wheel and the rear wheel, respectively, to increase the distributed load applied to the target wheel, in the case where the lateral slip suppressing control section determines that the lateral slip amount is greater than the lateral slip limit threshold.

* * * * *